United States Patent [19]
Burnham

[11] 4,047,258
[45] Sept. 13, 1977

[54] LIP LOCK WITH RELEASE AND COUNTERBALANCE FOR DOCK BOARD
[75] Inventor: Peter B. Burnham, Columbus, Ohio
[73] Assignee: Harsco Corporation, Camp Hill, Pa.
[21] Appl. No.: 747,078
[22] Filed: Dec. 3, 1976
[51] Int. Cl.² .................. E01D 1/00; E01D 15/06
[52] U.S. Cl. ...................................... 14/71.3
[58] Field of Search .................. 14/71.3, 71.5, 69.5
[56] References Cited
U.S. PATENT DOCUMENTS

| 3,249,956 | 5/1966 | Zajac | 14/71.3 |
|---|---|---|---|
| 3,323,158 | 6/1967 | Loomis | 14/71.3 |
| 3,409,922 | 11/1968 | Beckwith | 14/71.3 |
| 3,475,778 | 11/1969 | Merrick | 14/71.3 |
| 3,606,627 | 9/1971 | Potter | 14/71.3 |
| 3,699,601 | 10/1972 | Hecker | 14/71.3 |
| 3,982,295 | 9/1976 | Burnham | 14/71.5 |
| 3,997,932 | 12/1976 | Artzberger | 14/71.3 |
| 4,010,505 | 3/1977 | Bouman | 14/71.3 |

Primary Examiner—Nile C. Byers
Attorney, Agent, or Firm—Mahoney & Stebens

[57] ABSTRACT

A loading dock board or ramp is provided having a counterbalanced, extendable lip incorporating a releasable lock mechanism. The dock board is provided with a projecting lip pivoted to the outer end of a platform and includes mechanisms for automatically raising or swinging the lip to an upwardly elevated or projected position. A counter-balance spring is included in the structure for assisting in the upward swinging movement of the lip and is structurally combined with a lip lock mechanism to maintain the lip in the projected position. This lip lock includes an automatically releasable mechanism which responds to a rearwardly directed force applied to the edge of the lip when thus elevated, to overcome to counter-balance spring and effect release of the lock thereby permitting the lip to swing by gravity to a dependent position.

12 Claims, 11 Drawing Figures

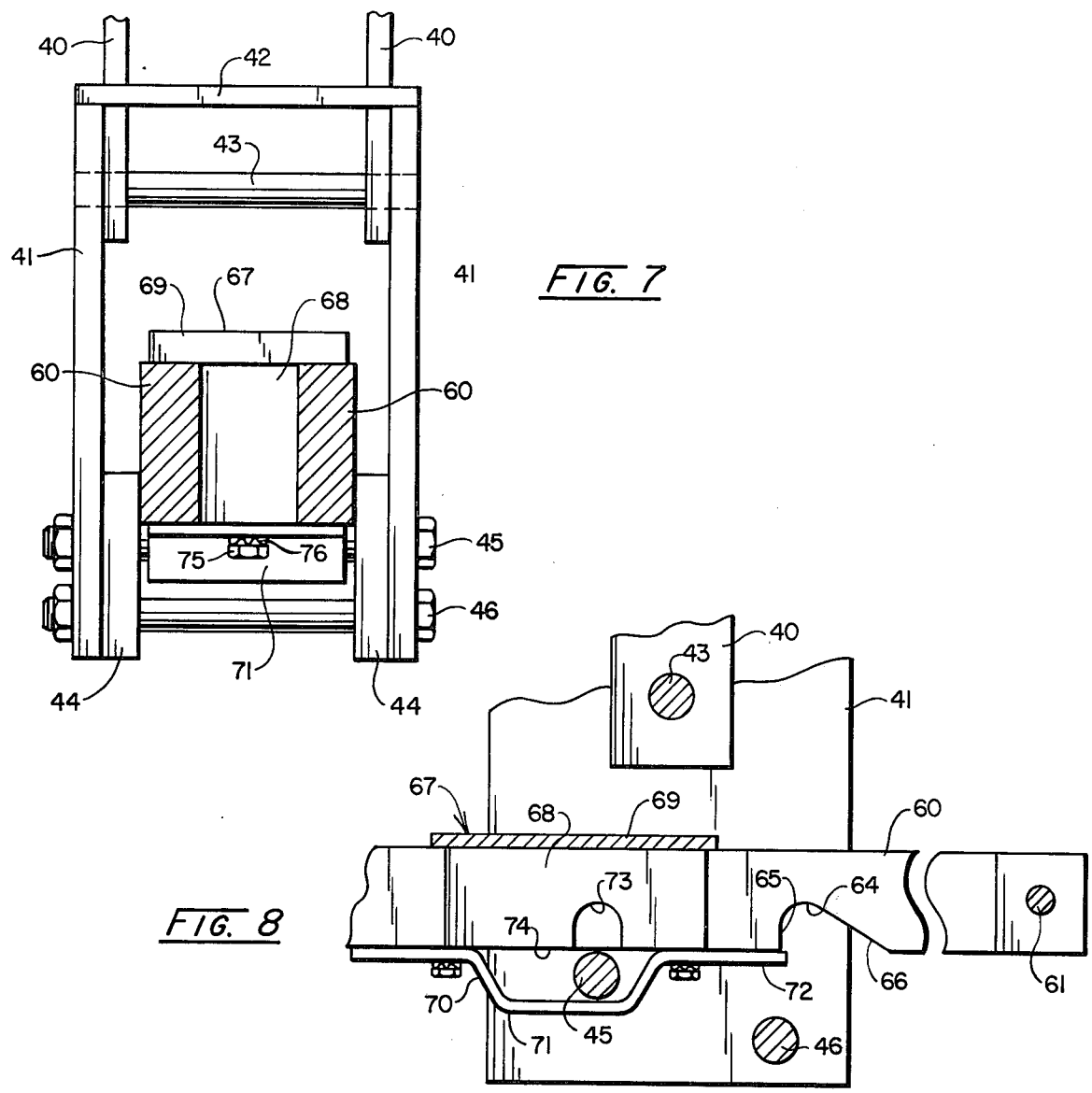
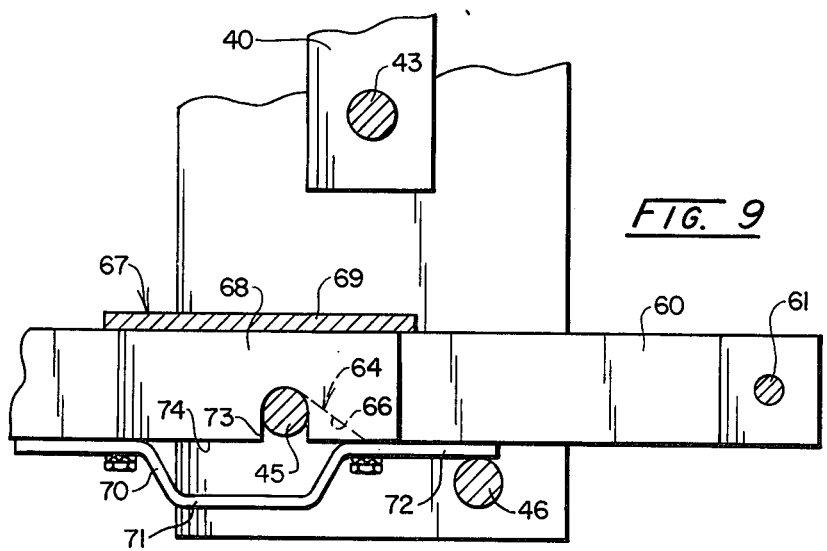

LIP LOCK WITH RELEASE AND COUNTERBALANCE FOR DOCK BOARD

BACKGROUND OF THE INVENTION

Dock boards and loading ramps have heretofore been provided for installation in loading docks to facilitate transport and transfer of materials or articles from a vehicle, such as a truck or trailer, that may be backed up to the loading dock for loading or unloading. These loading ramps, in general, include a horizontal platform which is mounted in a pit or recessed in the loadingdock for upward swinging movement. In a stored position, the platform or ramp is maintained or held in a horizontal plane so as to form a continuation of the loading dock surface. In this configuration, the ramp does not obstruct normal traffic on the dock. Various mechanisms are included in such loading ramps to effect the pivoting or swinging of the dock to an elevated position. Once the ramp has been raised, it is then lowered to align with the bed of the truck or trailer. To complete the transporting surface into the interior of a truck or trailer, the ramp is normally provided with a forwardly or outwardly projecting lip that forms a bridge between the ramp and the bed of the truck. This lip is pivoted on a hinge element at the outer end of the platform or ramp and is movable between a downwardly dependingly, stored position and an outwardly projecting position where it may extend into the interior of the truck.

Loading ramps of this type are also provided with a lock means that is effective in securing or maintaining the pivoted lip in an outwardly projecting position. The purpose of this lock is to maintain the lip in this outwardly extending relationship to the ramp so that it will then overlie and project into the interior of the truck as the ramp itself is lowered or swung downwardly to a load transferring position. Once the loading or unloading operation has been completed, the truck or vehicle is driven away from the dock and the loading ramp then lowered to its horizontal stored position. During the operation of the ramp, provision is usually made to permit the lip to be unlocked and released to enable the lip to swing to its vertical or downward depending position for storage. An example of such a structure is shown in U.S. Pat. No. 3,982,295 issued Sept. 28, 1976 to Peter B. Burnham.

SUMMARY OF THE INVENTION

In accordance with this invention, a novel releasable lip lock is provided for a loading ramp and which lock which will be automatically released in response to excess force applied in a general horizontal direction against the edge of an extended or projected lip. The objective of this automatic releasable lock mechanism is to prevent substantial damage to the lip or its supporting mechanism that can result where the lip is mechanically locked until such time as it is either manually released by an operator or is locked in the normal sequence of ramp operation. The lip lock structure, in accordance with this invention, as in the structure shown in U.S. Pat. No. 3,982,295, includes lever or bracket support elements interconnected by a locking mechanism. The disadvantage of the lock mechanism disclosed in that patent is that such a structure will be seriously damaged, in those instances where a truck or trailer is backed into the ramp and contacts the edge of the lip. This force is substantial and generally results in breaking of the mounting brackets or the lip lock and effectively disables the loading ramp until repaired.

A lip lock of this invention combines a counter balancing spring in combination with a novel, automatically releasable locking mechanism and is responsive to a horizontal, rearwardly directed force applied to the leading edge of the lip when pivoted to a projected position. Included in the lock mechanism of this invention is a pivoted lock support bracket and biasing spring that cooperate to achieve the desired advantageous operation of automatic release. Carried by the lock support bracket which is mounted on the platform or ramp structure, is a lock bar and a resiliently biased connector bar. The lock bar and connector bar are also mechanically coupled with the pivoted lip. The relative mounting of the lock bar and biasing spring on the support bracket, in accordance with this invention, is such that the spring is also effective in counter balancing the weight of the lip during substantially all of its pivoted swinging movement between a downwardly depending, stored position and an upper horizontally projecting position. This facilitates manual manipulation of the lip when it is desired to either raise or return the lip to its lowered position.

These and other objects and advantages of this invention will be readily apparent from the following detailed description of an illustrative embodiment thereof and the accompanying drawings.

DESCRIPTION OF THE DRAWING FIGURES

FIG. 7 is a fragmentary vertical sectional view taken along line 7—7 of FIG. 6.

FIGS. 8, 9, 10 and 11 are diagramatic sectional views similar to FIG. 5 showing sequential operation of the lip lock mechanism.

DESCRIPTION OF THE ILLUSTRATIVE EMBODIMENTS

Figure 1:
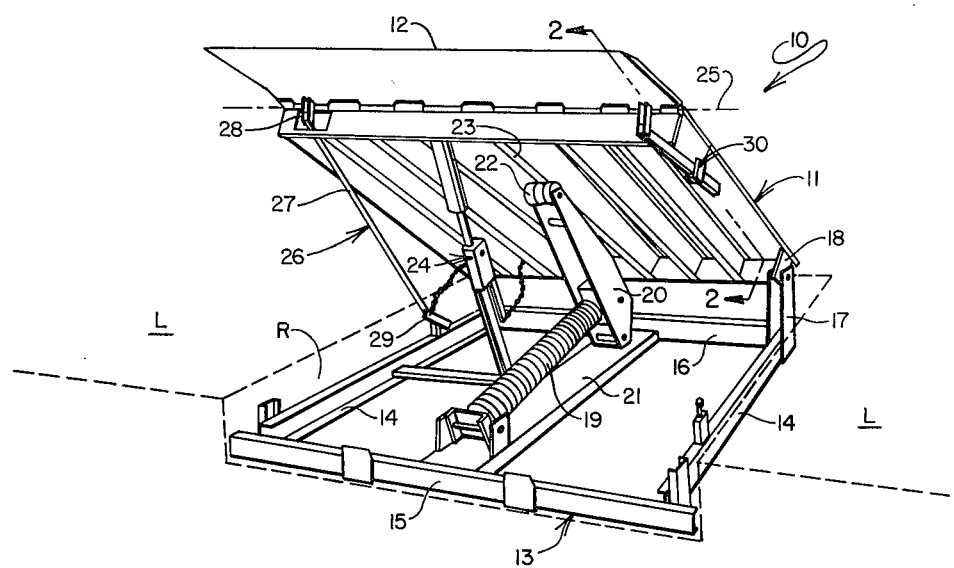
FIG. 1 is a perspective view of a loading ramp embodying this invention.

Having reference to the drawings, FIG. 1 illustrates a loading dock board designated generally by the numeral 10 and is diagrammatically shown positioned in relationship to a loading dock designated by the letter L. The loading dock L is only shown in broken lines and it will be seen that the dock board 10 is mounted or positioned in a recess R formed in the dock. This represents a typical installation of such a dock board and it will be noted that the dock board includes a platform or ramp 11 which is shown pivoted to its uppermost inclined position. The platform 11 is shown in this position for purposes of clarity in illustrating the major operating components. It will be understood that the ramp in a stored position would have the platform 11 secured in a substantially horizontal plane that is contiguous with the surface of the loading dock L. Also in that position, the lip 12 pivotally secured to the leading end of the platform 11 would be swung to a downwardly dependent position as will be shown in subsequent figures of drawings and in accordance with the description of the operation.

Forming a basic structural portion of the dock board 10 is a supporting frame 13 having a pair of elongated side elements 14 that are interconnected at the outer and inner ends by respective transverse elements 15 and 16. These elements of the supporting frame may be secured to each other by customary fastening procedures including welding. Also, it will be understood that this frame structure will be rigidly secured in the recess R formed in the loading dock L although that interconnection is not illustrated in FIG. 1 of the drawing.

Secured to innermost ends of the side elements 14 are a pair of upstanding struts 17. These struts 17 are pivotally interconnected at their upper ends to the platform 11 by bracket plates 18 which are secured to the platform at the bottom surface thereof. A pivot pin interconnects the bracket plates with the respective struts 17 and thus permits the platform 11 to swing about a horizontal axis from its horizontal position stored in the dock recess to the illustrated upwardly inclined position.

In the dock board structure shown in FIG. 1, raising or swinging of the platform 11 to the elevated position is effected by mechanical means comprising a relatively large spring 19 cooperating with a lever arm 20. This lever arm 20 is pivoted to a support bar 21 attached to the mounting frame. The lower end of the lever arm 20 is hinged to the mounting bar 21 and its upper end is provided with rollers 22 which engage a central longitudinally extending rail 23 attached to the lower surface of the platform. Latch means, not specifically illustrated, are also provided for maintaining the platform 11 in a lowered or horizontal position. Release of a holddown mechanism 24 permits the spring 19 to operate on the lever arm and cause the ramp or platform 11 to swing upwardly.

As previously indicated, the lip 12 is hinged to the outer end of the platform 11 for swinging movement about a horizontally extending axis 25. This lip 12, when swung to the illustrated position, forms an outwardly extending projection of the platform 11 and is designed to extend into the body or interior of a truck or trailer vehicle and form a bridge between the platform and vehicle. When not being utilized, the platform is pivoted to a stored position and prior thereto the lip 12 is swung or permitted to swing to a downwardly depending position. In accordance with the conventional structure of the illustrated loading ramp, the lip 12 is automatically swung or pivoted to the outwardly projecting position illustrated in FIG. 1 along with the raising of the ramp to this elevated position. This pivoting of the lip is accomplished by a pivoting mechanism designated generally by the numeral 26. This pivoting mechanism 26 includes an elongated arm 27 secured at one end to a lever arm bracket 28 attached to the bottom surface of the lip 12. The opposite end of the arm 27 is connected to the supporting frame 13 at one side element 14 by a toggle linkage 29. This toggle linkage 29 operates in a manner to cause the lip to swing upwardly when the platform 11 is lowered after reaching its upward position. If necessary for understanding of the operation, a specific and more detailed description may be obtained from U.S Pat. No. 3,982,295.

In accordance with this invention, a substantially improved lip lock mechanism 30 is provided for a loading dock 10 having the basic components of a platform or ramp 11 and a lip 12 pivoted to the leading edge of the platform. As previously indicated, this lip has the primary function of forming a bridge or extension from the platform into the vehicle or trailer body. The lip lock mechanism 30 of this invention and its structural relationship to the platform 11 and the lip 12 can be best seen in FIGS. 2 and 3. These figures show the lip 12 in a stored or downwardly depending position in respect to the platform 11 in FIG. 3 and extended or projected with respect to the platform 11 in FIG. 2. In the projecting relationship of FIG. 2, this lip 12 is normally angularly inclined downwardly with respect to the platform and will only be moved into co-planar relationship therewith when the outer end of the lip is supported on the bed of the truck. This basic operational sequence is well known in the art and does not require further explanation or discussion to illustrate the operation and structure of the improved lip lock mechanism.

Figure 2:
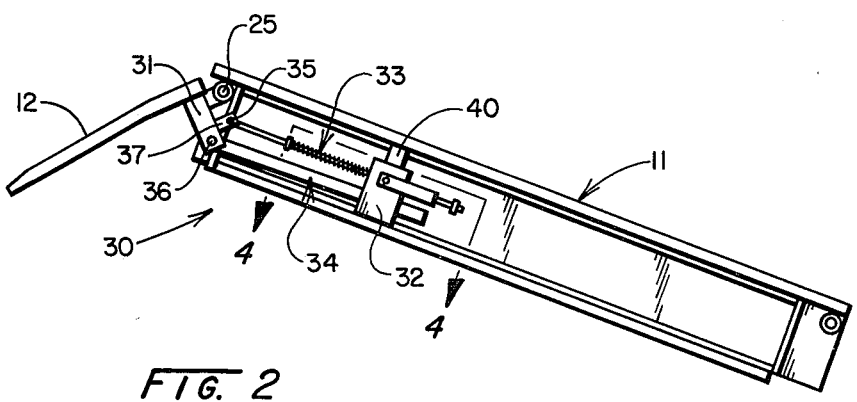
FIG 2 is a fragmentary vertical sectional view taken along line 2—2 of FIG. 1.
Figure 3:
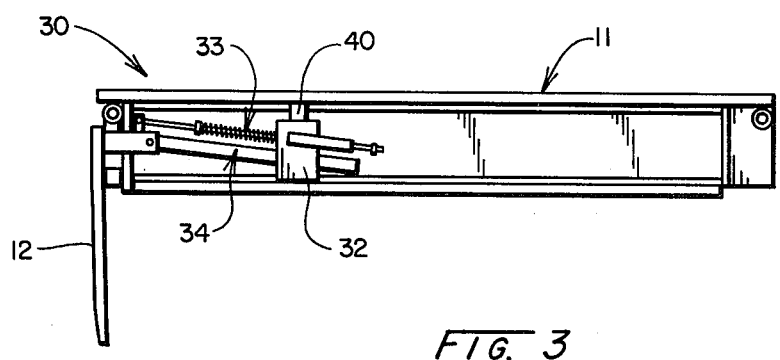
FIG. 3 is a sectional view similar to FIG. 2 but showing the lip in a downwardly depending position.
Figure 4:
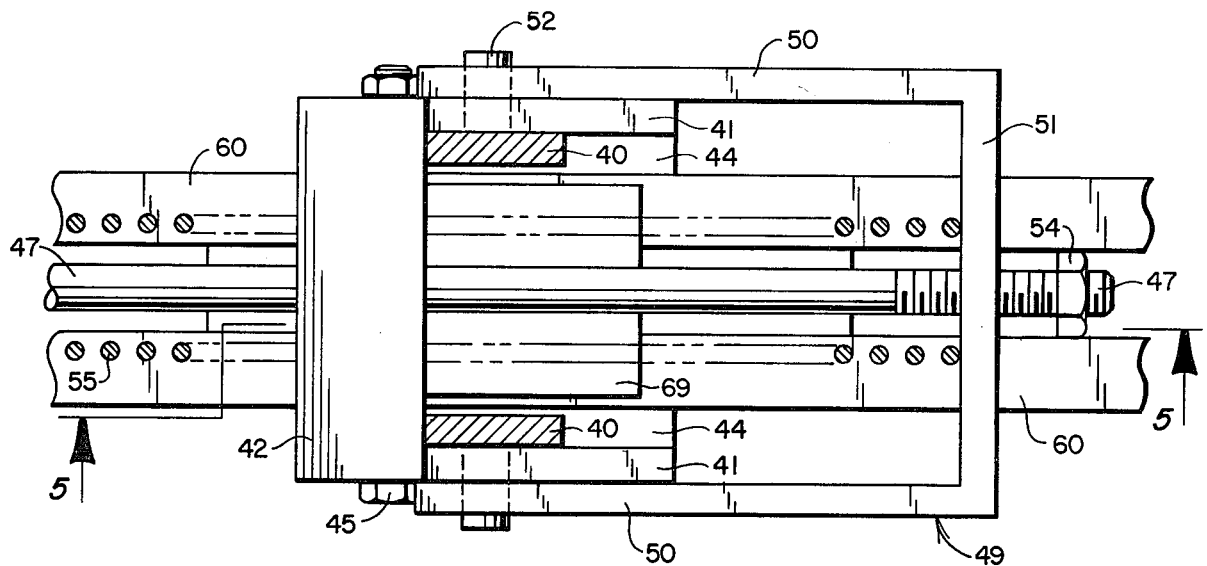
FIG. 4 is a fragmentary horizontal sectional view taken along line 4—4 of FIG. 2.
Figure 6:
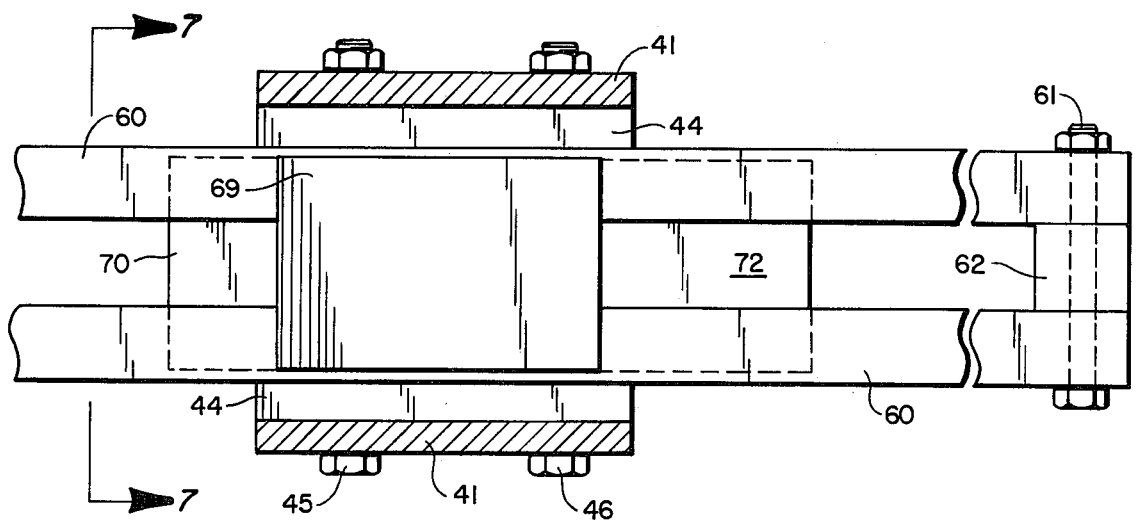
FIG. 6 is a fragmentary horizontal sectional view taken along line 6—6 of FIG. 5.

Referring specifically to FIG. 2, the lip lock mechanism 30 is attached to and suspended from the lower surface of the platform 11 and is also interconnected with the lip 12. This interconnection with the lip is effected by a lever bracket 31 which is rigidly fixed to the lower side of the lip 12. It will also be noted that this lever bracket 31 is affixed to the lip 12 in relatively close coupled relationship to the pivot axis 25 of the lip. The length of the lever bracket is determined by the forces to be encountered which are primarily represented by the weight of the lip that must be pivoted and supported. This lip lock mechanism 30 functions to provide the basic objective of supporting the lip 12 in the illustrated position of FIG. 2, subsequent to raising of the platform 11 to a upwardly inclined position to permit the lip to project into the interior of a vehicle that is to be backed up to the loading dock. This basic function is the same as that described in the previously issued patent.

Included in the lip lock mechanism 30 is a lock support 32, a resiliently biased connector bar 33 and an elongated lock bar 34. Both the connector bar and lock bar, 33 and 34, are mechanically coupled at one end thereof to the lock support 32 and are also mechanically coupled at their opposite ends with the lever bracket 31. It will be noted from the several figures that the connector bar 33 is disposed vertically above the lock bar 34 and the resepective ends thereof are pivotally connected at respective vertically spaced pivot axis 35 and 36 located on the lever bracket 31. For this purpose the lever bracket 31 may advantageously include a pair of plates 37 which are spaced apart a distance to receive the end portions of the connector and lock bars. Each of the connector and lock bars are also provided at this terminal end with a bearing socket 38 and 39 journaled for engagement with a respective pivot pin extending along the respective axis 35 and 36 and secured to the plates 37.

Suspension of the lock support 32 from the platform 11 is effected by a pair of hangar plates 40 which extend vertically downward from the platform 11 and are rigidly secured at their upper ends to the platform. These hanger plates 40 are laterally spaced apart with the lower end portion thereof projecting a distance into the interior of the lock support. The lock support includes a pair of spaced apart side plates 41 that are rigidly interconnected at their upper ends by a plate 42. This plate 42, as will be understood from subsequent description of the operation of this structure, also functions as a stop plate and, as can be best seen in FIG. 5, extends only over about one-third of the top of the lock support. The hangar plates 40 also take up about one-third of the upper end of the lock support.

The lock support 32 is pivoted on the hanger plates 40 by a transversely extending and horizontally disposed pivot pin 43. This pivot pin 43 extends transversely between the side plates 41 with its ends being secured in sockets formed in the respective plates. With this pivoted mounting, it will be seen from FIG. 5 that the lock support 32 normally hangs in a relatively vertical plane as the pivot pin 43 is located to interconnect at the upper end portions of the side plates. Secured to each of the side plates 41 at the lower inwardly facing surfaces thereof are a pair of spacer plates 44 which can be best seen in FIG. 7. Extending across and between the side plates 41 at the lower end portions thereof, are two pins which also function to mechanically secure the side plates in fixed relationship. One of the pins 45 is designated a lock pin and extends between the plate in adjacent relationship to the forwardly facing side of the lock support. The other pin 46, designated a release pin, extends between the plate closely adjacent the rearwardly facing side and will also be noted as being at a relatively lower elevation than the lock pin 45.

The resiliently biased connector bar 33 includes an elongated rod 47 having the bearing socket 38 secured to one end thereof for pivoted interconnection with the pivot pin at axis 35 on the lever bracket 31. This rod 47 is of a length to extend rearwardly and passes through the lock support 32 between the side plates 41 and projects a distance rearwardly of the support. Coupling the rod 47 to the lock support 32 is a U-shaped bracket 49 having a pair of elongated legs 50 and carrying a cross plate 51 in rigidly interconnected relationship at their one end. The U-shaped bracket 49 is normally disposed in a substantially horizontal plane having the free ends of the legs 50 extending along the exterior surfaces of the side plates 41 to approximately the midpoint of these plates. At this point, the legs 50 are pivotally connected to the plates by trunion pins 52 secured to each of the side plates 41. These trunion pins 52 project laterally outward from the surface of the plate in a horizontal direction and the ends of the bracket-plates 50 are journalled thereon.

The cross plate 51 is provided with a central aperture 53 through which the elongated rod 47 extends. A safety nut 54 is threaded onto an end portion of the rod extending through the cross plate 51. This safety nut 54 prevents withdrawal of the rod 47 through the aperture 53 during assembly and is not effective during operation. Mounted on the elongated rod 47 is a compression spring 55 having its one end disposed in abutting relationship to the inwardly facing side of the cross plate 51. The opposite end of the spring 55 engages an adjusting nut 56 which is also secured onto the rod. This positioning of the compression spring 55 thus results in a counterbalancing and resilient interconnection of the bar 33 between the lock support 32 and the lever bracket 31. It will be noted that the trunion pins 52 are located a distance vertically above the pivot pin 43 for the lock support. Accordingly, the resiliently biased connector bar 33 extends through the lock support in upwardly spaced relationship to the pivot pin 43.

It will also be understood that the compression spring 55 is of a length such that it is capable of accommodating the full length of travel required in the pivoting of the lip 12 from a downwardly depending position to the full horizontally projected position in coplanar relationship with the platform while continuously applying a biasing force through this travel. At any intermediate position the spring 55 will thus be compressed and provide a counterbalancing force for assisting in the upward pivoting of the lip. It will also be noted from FIGS. 2 and 3 that the point of relative interconnection and mounting of the resiliently biased connector bar 33 is such that when the lip 12 is in the downwardly depending or stored position, the pivot axis 35 will be disposed at a location where the spring 55 will aid in maintaining the lip in the stored position. When moving the lip 12 to a projected position, it will be necessary to further compress the spring 55 to a slight extent until the pivot axis 35 passes the dead center position. Subsequent to passing the dead center position, the spring 55 will then aid in counterbalancing the weight of the lip and facilitate movement of the lip 12 to its projected position.

Forming the elongated lock bar 34 are a pair of elongated plates 60 which also extend or project between the spaced apart side plates 41 of the lock support 32. These plates 60 are disposed in spaced parallel relationship and are rigidly interconnected by a bolt type fastening device 61 extending through the terminal ends of the plates and passing through the terminal ends of the plates and passing through a spacer element 62 inserted between the plates 60 and spacer element 62 can be secured together by welding. The opposite ends of the plates 60 are also rigidly interconnected in spaced relationship by being secured to the bearing socket 39. This bearing socket 39 is journalled on the pivot 36 of the lever bracket 31.

It will be noted that the plates 60 forming the lock bar 34 pass between the side plates of the lock support 32 at a position above the lock pin 45. Accordingly, the lower edge surfaces of the plates 60 will ride along the upper surface of the pin 45 during longitudinal reciprocating movement of the lock bar accompanying the pivoting or swinging of the lip 12. It will also be noted from FIG. 5 that each of the plates 60 is provided with a downwardly opening notch 64 having a substantially vertical surface 65 formed at the forward side. The depth of the notch is at least as great as the diameter of the cylindrical lock pin 45 so that when the lock pin is positioned in the notch, the pin will securely contact the vertical surface 65. An opposite surface 66 of the notch 64 is relatively inclined and forms a cam surface for purposes which will become apparaent in the subsequent description of the mechanism's operation.

Releasable interconnection of the lock bar 34 with the lock support 32 is effected by coupling means 67. This coupling means 67 includes a lock plate 68 which is interposed between the elongated plates 60 and is longitudinally slidable relative thereto. The lock plate 68 is of a vertical height to extend at least to the upper and lower endge surfaces of the plates 60 and has a cap plate 69 secured to the upper surface thereof. Secured to the lower side of the lock plate 68 is a retainer bracket 70. The retainer bracket 70 comprises an elongated plate having a central, downwardly depending portion 71 forming a U-shaped recess that is of a depth to receive the lock pin 45 and permit sliding movement thereof through the longitudinal extent of the depending portion 71. Also, the retainer bracket 70 includes longitudinal extensions at each end forming bearing or support surfaces along which the plates 60 may readily reciprocate. Additionally, the one extension 72 forms a bearing surface which overlies the release pin 46. It will be noted from FIG. 7 that both the cap plate 69 and retainer bracket 70 are of a width to extend a distance laterally outward from each side of the lock plate 68. Accordingly, the plate and bracket overlie the upper and lower edge surfaces of the elongated plates 60 forming the lock bar 34 and serve to retain the coupling means 67 in interconnected relationship with the lock bar and retained in association with the lock pin 45. The retainer bracket 70 is secured to the lock plate 68 by bolts 75 which have spring washers 76 to resiliently clamp the plates 60 and enhance frictional engagement for positive movement of the coupling means 67 with the lock bar 34.

Also formed in the lock plate 68 is a downwardly opening notch 73 which is disposed at the rearward end portion of the lock plate. This notch is also of a depth and size to receive the lock pin 45 when aligned with the notch 64. It will also be noted in FIG. 5 that the lock plate 68 and associated depending portion 71 of the retainer bracket are of the length such that, with relative reciprocating movement, the pin 45 will either engage a lower horizontal edge 74 of the lock plate or will be relatively positioned to enter the notch 73.

Figure 5:
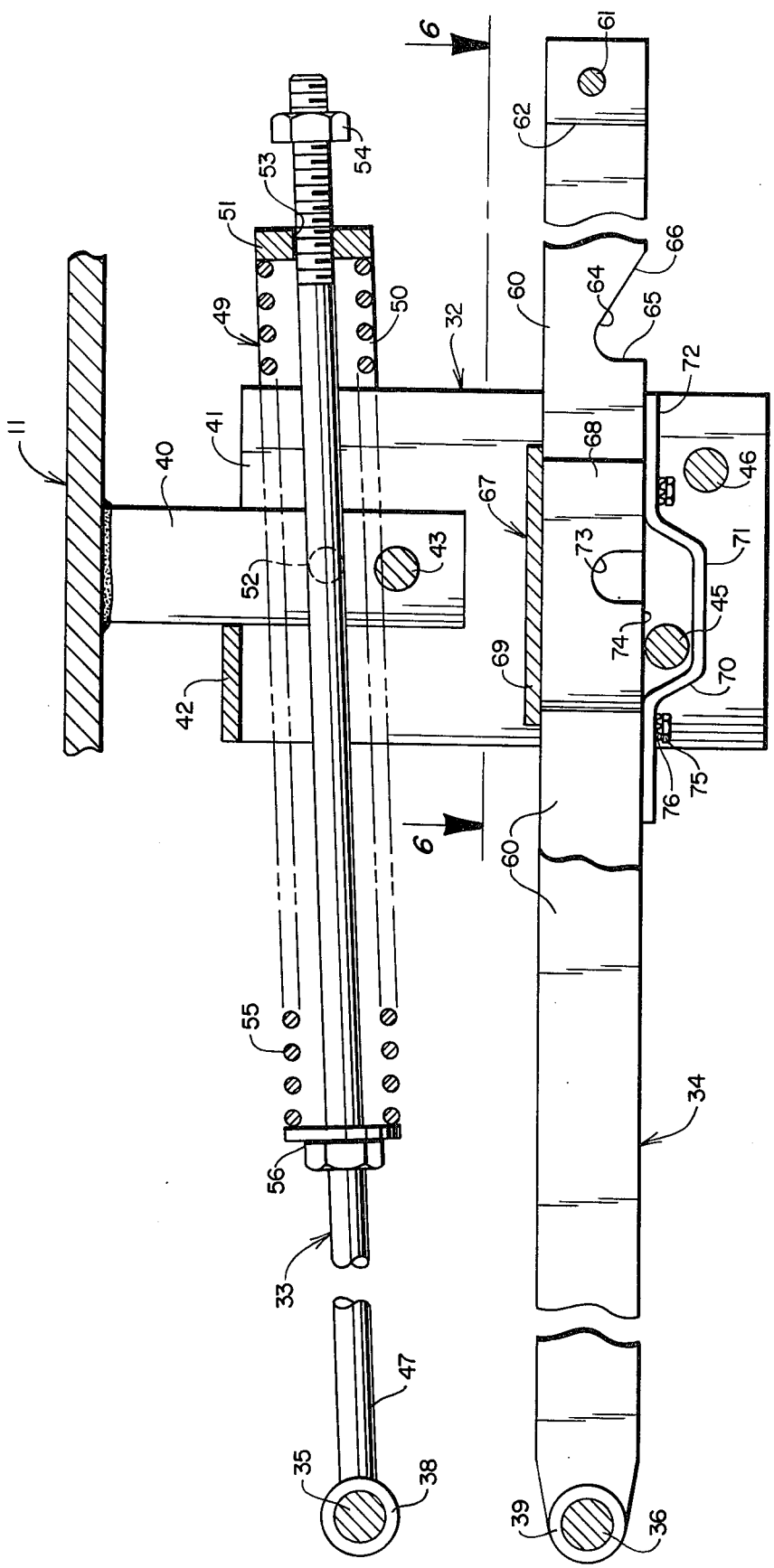
FIG. 5 is a fragmentary vertical sectional view taken along line 5—5 of FIG. 4.

Having thus described the specific structural embodiment of the lip lock mechanism 30, the advantageous operation and function of the mechanism will be readily understood by reference to the sequential operation diagram illustrated in FIGS. 8, 9, 10 and 11. This operational sequence is based on movement of the lip 12 between the downwardly depending position shown in FIG. 3 and that of the outwardly projecting position shown in FIG. 2. With the lip 12 in the stored position shown in FIG. 3, the lock support 32 and coupling means 67 will be oriented as shown in FIG. 5. As previously noted, it will also be seen that the resiliently biased connector bar 33 will be operative in this position to place a rearwardly directed force on the cross plate 51 of the bracket 49 attached to the upper end portion of the lock support, 32. Also in this configuration, the lock support 32 will have been pivoted to its maximum clockwise extent limited by the stop plate 42 engagement with the hanger plates 40. The coupling means 67 will also be displaced to its most rearward position.

In this position, the notch 64 formed in the lock bar plates 60, will be displaced some distance to the rear of the lock support. The lock plate 68 will be positioned to have the edge 74 resting on the lock pin 45 and the notch 73 thus disposed rearwardly of the lock pin.

As the lip 12 is swung upwardly, either by manual swinging movement by an operator or in automatic sequence with operation of the loading ramp pin as previously described and illustrated in detail in U.S. Pat. No. 3,982,295, the lock bar 34 will be displaced forwardly and the plates 60 pass forwardly between the side plates 41 of the lock support. Concurrently with this movement, the coupling means 67 through frictional engagement with plates 60, will also be displaced forwardly to a position substantially as shown in FIG. 8 with the notch 73 aligned with the lock pin 45. In this position, the lower edges of the plates 60 will continue to ride along the upper side of the lock pin 45 which, although aligned with the notch 73, will be unable to enter that notch. Further movement of the plates 60 in a forward direction will result in positioning of the notch 64 of the lock bar plates 60 in aligned relationship with the lock pin 45. When thus aligned, the lock pin 45 will then enter the notches 73 and 64 which results in a downward displacement of the coupling means 67 and associated portions of the plates 60. This alignment of the lock pin 45 with the two notches, occurs at a predetermined point where the lip 12 is positioned at the desired downwardly inclined position shown in FIG. 2. Accordingly, the lip 12 will thus be retained in this projected position since the vertical surface 65 of the notch will engage the lock pin 45 and thus maintain the lock bar 34 in a position to hold the lip 12 at this desired position.

During the upward swinging movement of the lip 12 in accordance with the normal operational sequence, it will be understood that the compression spring 55 will be functional to assist and aid in raising the lip to this upward displaced position. This spring 55 is selected so that it is unable by itself to raise the lip to this position. However, the strength of the spring is such that very little force would be required to pivot the lip to this position. Accordingly, manual operation and extension of the lip to this projected position can be readily acomplished whenever necessary. It will also be noted that this swinging of the lip to the projected position does not result in any pivoting of the lock support 32 about the axis of its pivot pin 43. The reason such pivoting movement does not occur is that the spring 55 also functions to maintain the stop plate in contacting engagement with the hangar plates 40.

In further normal operation of the lock mechanism and loading ramp 10, after the vehicle is backed into proper relationship to the dock, the platform 11 is further lowered to bring the lip 12 into bridging relationship and engagement with the vehicle bed. This further downward movement of the platform 11 with the outer end of the lip resting on the truck bed results in a further upward swinging of the lip 12 to place the lip in substantial co-planar relationship to the platform 11. This additional movement of the lip 12 will result in corresponding further forward displacement of the plates 60 of the lock bar 34. With this further displacement, the inclined or cam surface 66 of the notch 64 in the plate 60 will ride up over the lock pin 45 and thus result in withdrawal of the lock pin from the notch 73 as well as out of engagement of the notch 64 through vertical elevation of the coupling means 67 thus withdrawn from the notch 73, it can be seen that the plates 60 may be further extended in a forward direction and position the notch 64 at some point forward of the lock pin 45.

Upon conclusion of operations with respect to loading or unloading of the vehicle, the vehicle is then driven or pulled away from the loading dock. When this occurs, there is no longer any support for the lip 12 which will then swing to its downward depending stored position. This downward swinging movement will be restricted by the compression spring 55 which tends to counterbalance and retard the downward swinging movement. Effectively, the counterbalance spring 55 cushions the return of the lip to its stored position.

Figure 10:
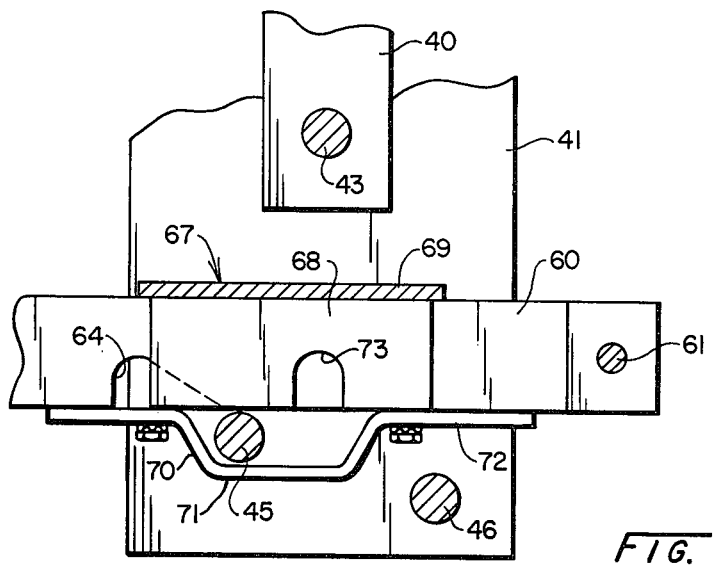
Figure 11:
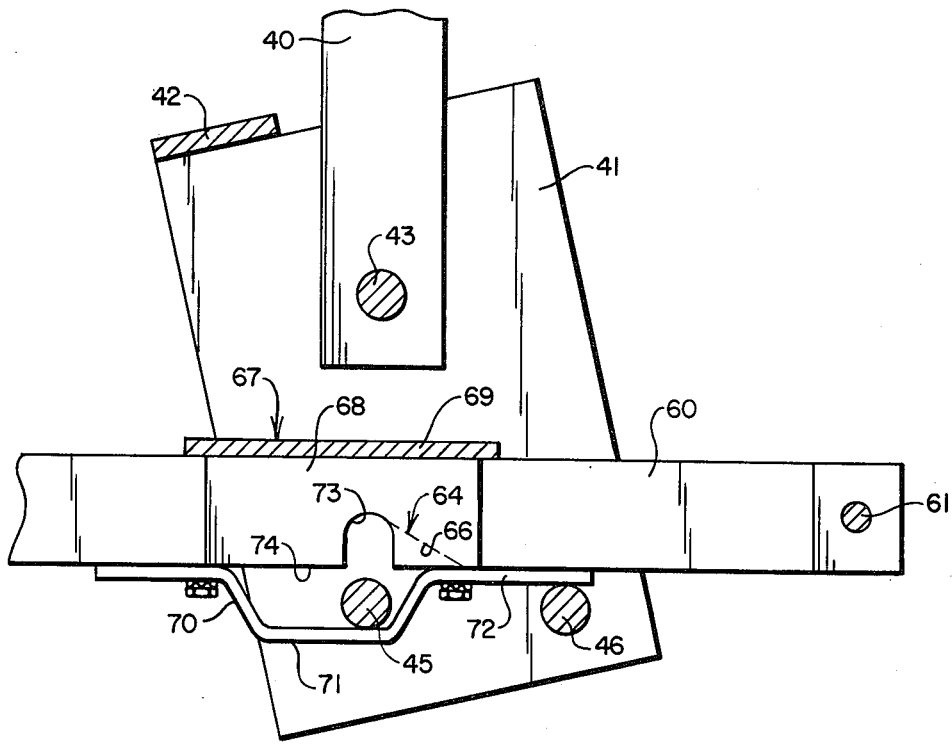

Concurrently with the downward swinging movement of the lip 12, the plates 60 of the lock bar 34 will be reciprocated in a reverse and will simultaneously move the coupling means 67 in a rearward direction. The extent of rearward movement of the coupling means 67 is limited by the longitudinal extent of the depending portion 71 of the retainer bracket 70. This movement which occurs at the initial rearward movement of the plates 60 results in the lock plate 68 again being supported at its lower edge 74 on the lock pin 45. At this time, the portion of the lock bar plates 60, having the notch 64 formed therein, will pass over the lock pin 45. However, since the lock plate 68 is supported on the pin 45, the plates will be maintained in this position and continue rearward movement as the notch 64 will not engage the lock pin. This relationship of rearward movement of lock plates 60 is shown in FIG. 10 and it will be seen that the lock bar 34 may continue in its rearward movement and permit the lip 12 to pivot downwardly to its stored position. This operation of the lock mechanism is essentially the same as that which is disclosed in U.S. Pat. No. 3,982,295. The specific construction of the present lock mechanism differs as the structure of this invention also includes a resiliently biased connector bar for purposes which will be explained hereinafter.

The primary advantageous feature of the improved lock mechanism 30 of this invention is that it is able to unlock and release in the event that a truck when backed toward the loading dock, engages the terminal or leading edge of the lip 12. Whereas in the case of the structure shown in the cited patent, this force could result in substantial damage to the mechanism, such is not the case with this releasable lip lock mechanism. The functioning of this lip lock mechanism for automatic release in the event such a force is applied to the lip, results from the combination of the resiliently biased connector bar 33 and the lock bar 34 cooperating with the coupling means 67. This operation can be best explained by first referring to FIG. 9 of the drawings. In that figure, the clamp coupling means 67 and elongated plates 60 of the lock bar are positioned to maintain the lip 12 in its projected position. However, it will also be noted here that the trailing extension 72 of the retainer bracket 70 is effectively resting on the release pin 46. The diamensional configuration and construction of the lock mechanism is designed to result in this arrangement when the lip 12 is projected to the extended position of FIG. 2.

However, with an excessive force applied to the outer end or edge of the lip 12, this force will then be transmitted through the lever bracket 31 to the lock support 32 by both the resiliently biased connector bar 33 and the lock bar 34. The interconnection of the lock bar 34 being relatively rigid with respect to the lock support 32 at this time, the effect of such a force application will be to pivot the lock support 32 about its axis 45. The compression spring 55 mounted on the rod 47 will permit the support 32 to pivot in a counter clockwise manner as seen in either FIG. 5 or as diagrammatically shown in FIG. 11. Concurrently with the pivoting of the support 32, it will be seen that the release pin 46 will be swung upwardly in contacting relationship to the extension 72 of the retainer bracket 70 and result in relative lifting of the bracket lock plate 68 of the coupling means and the plates 60 of the lock bar 34. This vertical lifting will be to an extent where the lock pin 45 will be withdrawn from the aligned notches 64 and 73. With the lock pin 45 thus disengaged from the notches of the coupling means 67 and lock bar 34, it will seem that the lock bar can then be displaced rearwardly and permit downward swinging of the lip 12. Once the lock bar 34 has moved vertically and is disengaged from locked relationship to the support 32, the pivoting force is thus removed from the support and the compression spring 55 will again return the support 32 to its illustrated vertical position shown in FIG. 5.

Having thus described this invention, it will be readily apparent that a novel automatically releasable lip lock mechanism is provided to prevent damage to the dock board when a vehicle is inadvertently backed into the leading edge of a projected dock board lip. Additionally, the spring biased mechanism effectively counterbalances the weight of the lip and greatly facilitates pivoting of the lip, either manually or mechanically.

Having thus described this invention, what is claimed is:

1. A lip lock mechanism for releasably maintaining a lip pivoted to a leading edge of a loading ramp in a projected position comprising a lock support suspended from the loading ramp for pivoted movement about a horizontal axis extending parallel to the leading edge of the ramp, said support displaced a distance rearwardly from the leading edge of the ramp with the horizontal axis being in downwardly spaced relationship to the ramp, an elongated connector bar mechanically coupled with said lock support in vertically spaced relationship to the horizontal axis and extending forwardly with a leading end pivotally connected with the lip, resilient biasing means interconnecting said bar with said lock support for normally urging said bar in forwardly extending relationship but permitting relative rearward movement, an elongated lock bar coupled with said lock support in vertically spaced relationship to the horizontal axis at a side opposite that to which said connector bar is coupled, said lock bar extending forwardly with a leading end thereof pivotally connected with the lip, coupling means releasably connecting said lock bar with said lock support, said coupling means including a lock pin carried by said lock support in horizontally disposed relationship, and a lock plate connected in retained relationship with said lock pin for limited reciprocating movement thereto and engaged with said lock bar for sliding movement longitudinally relative thereto, said lock plate having a notch formed therein for receiving said lock pin, said lock bar having a notch formed therein for receiving said lock pin, said lock bar notch having a surface formed at a forward side which, when said lock pin is received therein, prevents rearward movement of said lock bar and a surface formed at a rearward side which will cam the lock bar out of engagement with said lock pin as the lock bar is moved forwardly, and, a lock release member carried by said lock support for engaging said lock bar upon pivoting of said lock support to move the lock bar out of locking engagement with said lock pin.

2. A lip lock mechanism according to claim 1 wherein said connector bar includes an elongated rod having one end pivotally connected with the lip and another end pivotally connected with said lock support, said resilient biasing means comprising a coil-type compression spring mounted on said connector rod.

3. A lip lock mechanism according to claim 2 which includes a bracket member carried by said lock support and said elongated rod is coupled with said bracket to permit limited axial reciprocation of said rod relative to said bracket.

4. A lip lock mechanism according to claim 3 wherein said spring is disposed in compressed relationship between said bracket and a stop member secured to said rod intermediate said bracket and the end thereof pivotably connectable to the lip.

5. A lip lock mechanism according to claim 3 wherein said bracket is a U-shaped member having leg elements pivoted to said lock suport for relative swinging movement about a horizontal axis.

6. A lip lock mechanism according to claim 3 wherein said bracket is pivotally connected to said lock support for swinging movement about a horizontal axis.

7. A lip lock mechanism according to claim 1 wherein said connector bar is pivotally connected to said lock support.

8. A lip lock mechanism according to claim 7 wherein the pivotal connection of said connector bar includes a pivot axis disposed vertically above said lock support pivot axis.

9. A lip lock mechanism according to claim 8 wherein said lock support includes stop means cooperatively interengageable with a fixed support element carried by the ramp to limit pivotal movement of the lock support in one direction.

10. A lip lock mechanism according to claim 1 wherein said lock plate includes a horizontal edge portion extending a distance forwardly of the notch formed therein and has a retainer bracket secured thereto at said edge, said retainer bracket having a depending portion disposed in spaced relationship to said edge portion to receive said lock pin in transversely extending relationship, said depending portion of a longitudinal extent to permit longitudinal displacement of said lock pin either in the notch of said lock plate or in engagement with the edge portion.

11. A lip lock mechanism according to claim 1 wherein said coupling means includes an elongated surface element engageable with said release member, said surface element interposed between said lock bar and said release member for relative longitudinal displacement therebetween.

12. A lip lock mechanism according to claim 1 wherein said release member is a pin disposed horizontally and parallel to said lock pin in vertically and horizontally spaced relationship thereto.

* * * * *